June 16, 1942.  C. E. TACK  2,286,517
DISK BRAKE
Filed Oct. 23, 1940  2 Sheets-Sheet 2
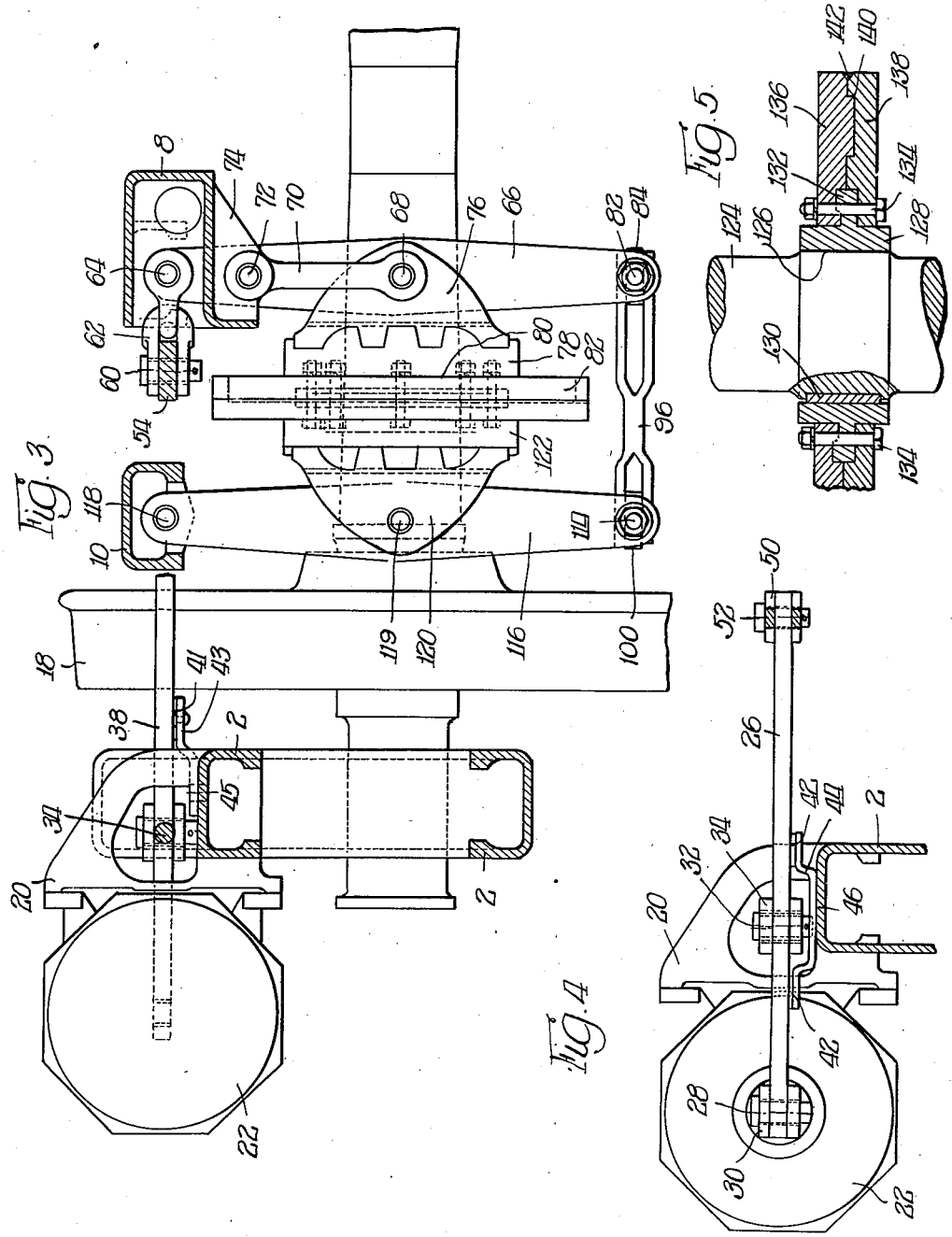
INVENTOR.
Carl E. Tack,
BY Patented June 16, 1942

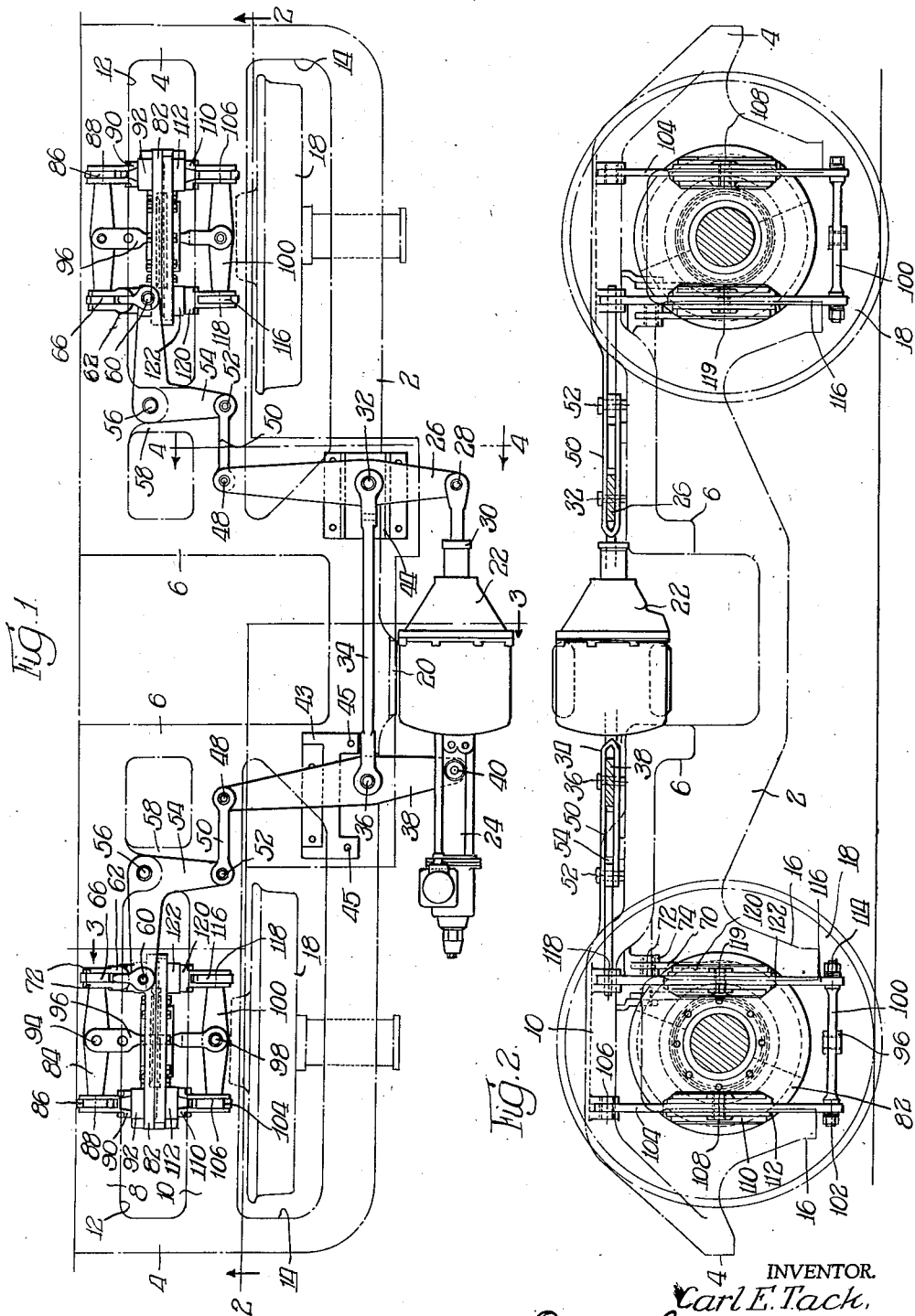

2,286,517

UNITED STATES PATENT OFFICE 2,286,517

DISK BRAKE

Carl E. Tack, Chicago, Ill., assignor to American Steel Foundries, Chicago, Ill., a corporation of New Jersey Application October 23, 1940, Serial No. 362,309

26 Claims. (Cl. 188—59)

My invention relates to brake rigging for a railway car truck, and more particularly to a type of rigging wherein a plurality of braking disks may be associated with each axle of the truck and operated by power means mounted on the side rails of the car truck.

Under modern conditions considerable development is taking place of braking means associated with the wheel and axle assemblies in such ways as to afford additional braking surfaces to those heretofore commonly used on the wheel treads. In some cases at least, it has been found desirable to eliminate entirely the braking from the wheel tread surfaces and to make use of other means such as disks or rotors associated with the wheel and axle assemblies in normal manner to rotate therewith and arranged for braking engagement with suitably mounted shoes or stators.

My novel design contemplates such an arrangement as that just mentioned wherein a plurality of disks may be mounted upon each axle, one at each side of the truck, and suitable braking shoes may be mounted for engagement therewith, said braking shoes being supported from the truck frame, and the operating means for the brakes at each side of the truck being accessibly mounted on the side rail centrally thereof.

An object of my invention is to devise relatively simple braking means of the type described with a minimum of connecting levers and pull rods required for actuation of the brakes.

My invention contemplates an arrangement wherein a plurality of brake shoes will have engagement with each side of each disk and wherein the brake shoes at opposite sides of the disk will be aligned with each other and simultaneously actuated by interconnected levers.

My novel design comprehends an arrangement wherein the brake shoes are supported from similar live and dead levers at opposite sides of each disk and wherein each pair of live and dead levers is supported for movement transversely of the truck with the live levers at one side of each disk and the dead levers at the opposite side thereof being interconnected and operating in unison.

A different object of my invention is such a device as that described, wherein the parts are especially adapted to accommodate present operating conditions and are designed to meet all manufacturing and operating requirements for present high-speed equipment.

In the drawings, Figure 1 is a top plan view of one-half a car truck and brake assembly constructed in accordance with my invention. Only one-half of the truck and brake rigging is shown inasmuch as the arrangement is similar at opposite sides of the truck.

Figure 2 is a side elevation, partly in section, of the truck and brake arrangement shown in Figure 1, the section being taken substantially in the vertical longitudinal planes indicated by line 2—2 of Figure 1.

Figure 3 is a further sectional view taken in the transverse vertical planes substantially as indicated by the line 3—3 of Figure 1.

Figure 4 is a further sectional view in the transverse vertical plane taken substantially as indicated by the line 4—4 of Figure 1.

Figure 5 is a fragmentary sectional view showing the manner of securing on the axle the braking disks. As shown, the section is taken in the horizontal plane bisecting the braking disk and the associated brake disk hub with the supporting axle in elevation.

For the sake of clarity, in each of the views certain details may be omitted where they are better shown in other views.

My novel arrangement comprises a truck frame of known form having the side rail 2 and end rails 4, 4 at respective ends of the truck, and spaced transoms 6, 6 adjacent the middle of the frame between which may be supported in the usual manner a bolster (not shown). Joining the transom and the end rail 4 at each end of the truck and at each side thereof are spaced inboard and outboard struts designated respectively 8 and 10, and between said struts may be formed the brake disk openings 12, 12. Wheel openings 14, 14 may be formed between the outboard struts 10, 10 and the side rail 2. At each end of the truck the side member 2 is formed with spaced pedestal jaws 16, 16 as means for connection to journal boxes (not shown) connecting the journal ends to the spaced wheel and axle assemblies 18, 18.

Adjacent the transverse center line of the truck each side member 2 is formed with a cylinder bracket 20 on which may be conveniently supported power means or brake cylinder 22 together with the automatic slack adjuster 24 which is secured on the cylinder 22 opposite the piston end.

The brake arrangement comprises the horizontal live cylinder lever 26 pivotally connected at its outer end as at 28 to the piston 30 of the power means 22. Intermediate its ends the live cylinder lever 26 is pivotally connected as at 32 to the pull rod 34, the opposite end of which has a pivotal connection as at 36 to the horizontal dead cylinder lever 38 whose outboard end has a pivotal and adjustable connection as at 40 to the slack adjuster 24. The dead cylinder lever 38 is afforded slidable support intermediate its ends as at 41 from the wear plate surface on the angle bracket 43 secured as at 45, 45 on top the side member 2. The live cylinder lever 26 is slidably supported at spaced points on wear plates as at 42, 42 (Figure 4) on the angle bracket 44 which is supported as at 46 on top the side rail 2. At the inner end of each cylinder lever is pivotally connected as at 48 a link 50, the opposite end of which has a pivotal connection as at 52 to the bell crank 54 which is pivotally mounted intermediate its ends as at 56 on the transverse integral member 58 extending between the struts 8 and 10 adjacent the transom 6. The other end of the bell crank 54 has a pivotal connection as at 60 to the clevis means 62, and the opposite end of the clevis means has a pivotal connection as at 64 (Figure 3) to the upper end of the live brake lever 66 which is pivotally supported intermediate its ends as at 68 by the paired hangers 70, 70, the upper ends of said hangers having a pivotal connection as at 72 from the bracket 74 on the under side of the strut 8. At the pivotal point 68 intermediate the ends of the live truck lever 66 is also pivotally supported the brake head 76, and on said head may be carried the brake shoe 78 having flat face engagement as at 80 with the annular braking surface afforded on one side of the rotating braking disk 82. The lower end of the live truck lever 66 has a pivotal connection as at 82 to the horizontal connecting lever or tie bar 84 and the opposite end of said lever 84 is pivotally connected to the lower end of the dead truck lever 86 (Figure 1), the upper end of which is fulcrumed as at 88 from the strut 8. Intermediate the ends of the dead truck lever 86 is pivotally supported the brake head 90 carrying the brake shoe 92 for engagement with the opposite side of the inboard annular face of the braking disk. Intermediate the ends of the connecting lever 84 is pivotally and adjustably connected as at 94 the pull rod 96 whose outboard end has a pivotal connection as at 98 to the connecting lever or tie bar 100. One end of the connecting lever 100 is pivotally connected as at 102 (Figure 2) to the lower end of the truck lever 104, the upper end of which is fulcrumed as at 106 from the strut 10. Intermediate the ends of the lever 104 is pivotally supported as at 108 the brake head 110 carrying the brake shoe 112 for engagement with one side of the outboard annular face of the brake disk 82, said shoe 112 being positioned opposite the before-mentioned shoe 92 engaging the inboard side of said disk. The other end of the connecting lever 100 has a pivotal connection as at 114 (Figure 3) to the lower end of the dead truck lever 116, the upper end of which is fulcrumed as at 118 (Figure 2) from the strut 10. Intermediate the ends of the dead truck lever 116 is pivotally supported as at 119 the brake head 120 carrying the brake shoe 122 for engagement with the opposite side of the outboard annular face of the braking disk 82, said brake head 120 being disposed directly opposite the brake head 76.

The manner in which the brake disk 82 is secured upon the axle is shown in detail in Figure 5 wherein it may be seen that the axle 124 is afforded a shoulder upon which may be press-fitted as at 126 the braking disk hub 128, said hub being afforded key means as at 130 to prevent rotation of said hub on said axle. The hub is formed with an integral annular flange 132 to which may be secured by a series of bolts 134, 134 the inboard and outboard halves of the disk designated respectively 136 and 138, said disk being interlocked as at 140 and welded around the perimeters of their adjacent edges as at 142 to prevent warpage of said disk in operation.

In operation, actuation of the power means 22 causes the live cylinder lever 26 to rotate in a counter-clockwise direction about the pivot point 32, and further rotation of said lever 26 moves the pull rod 34 to the right causing the dead cylinder lever 38 to rotate in a clockwise direction thus actuating the respective braking means at opposite ends of the truck. Referring to the braking means at the left end of the truck, clockwise rotation of the dead cylinder lever 38 will rotate the bell crank 54 in a counter-clockwise direction about its pivot 56 thus rotating the live truck lever 66 in a counter-clockwise direction (Figure 3) about the pivot at its lower end until the brake shoe 78 mounted intermediate its ends engages the adjacent disk. At the same time the tie bar 84 will be rotated in a counter-clockwise direction (Figure 1) thus actuating the dead truck lever 86 at the opposite end of the connecting lever 84. At the same time the moment of the connecting lever 84 will cause the pull rod 96 to move inboard thus drawing inboard the tie bar 100 and so actuating the dead truck levers 104 and 116 to bring the brake shoes at the opposite sides of the disk into engagement with their braking surfaces. It will thus be seen that the actuation of the single live truck lever 66 operates through the connecting levers 84 and 100 and the pull rod 96 or the other three dead truck levers 86, 104, and 116. I have thus devised a novel means for actuating four brake shoes associated with a single braking disk, two at each side thereof at opposite edges of the peripheries of the braking surfaces thereof.

It is to be understood that I do not wish to be limited by the exact embodiments of the device shown which are merely by way of illustration and not limitation as various and other forms of the device will, of course, be apparent to those skilled in the art without departing from the spirit of the invention or the scope of the claims.

I claim:

1. In a railway car truck, a frame, a supporting wheel and axle assembly having a rotatable braking disk, dead truck levers fulcrumed at their upper ends from said frame outboard said disk, a tie bar connecting the lower ends of said dead levers, live and dead truck levers supported from said frame at the opposite side of said disk, a tie bar connecting the lower ends of said last-mentioned levers, a pull rod adjustably connecting said tie bars, brake heads and brake shoes supported on each of said levers for engagement with opposite faces of said disk at opposite sides of said axle, the brake heads and brake shoes engaging opposite faces of said disk being aligned transversely of said truck, and means for actuating said live truck lever, said actuating means comprising a bell crank fulcrumed on said frame.

2. In a railway car truck, a frame, a supporting wheel and axle assembly having a rotatable braking disk, dead truck levers fulcrumed at their upper ends from said frame outboard said disk, a tie bar connecting the lower ends of said dead levers, live and dead truck levers hung from said frame at the opposite side of said disk, a tie bar connecting the lower ends of said last-mentioned levers, a pull rod adjustably connecting said tie bars, brake heads and brake shoes supported on each of said levers for engagement with opposite faces of said disk at opposite sides of said axle, the brake heads and brake shoes engaging opposite faces of said disk being aligned transversely of said truck, and means for actuating said live truck lever.

3. In a railway car truck, a frame, a supporting wheel and axle assembly having a rotatable braking disk, dead truck levers fulcrumed at their upper ends from said frame outboard said disk, a tie bar connecting the lower ends of said dead levers, live and dead truck levers hung from said frame at the opposite side of said disk, a tie bar connecting the lower ends of said last-mentioned levers, a pull rod adjustably connecting said tie bars, brake heads and brake shoes supported on each of said levers for engagement with opposite faces of said disk at opposite sides of said axle, and means for actuating said live truck lever, said actuating means comprising a bell crank fulcrumed on said frame.

4. In a railway car truck, a frame comprising side rails, end rails, spaced transoms, struts connecting said end rails and transoms at each end of the truck, supporting wheel and axle assemblies carrying brake disks, braking means for each end of the truck comprising dead levers supported from a strut at one side of each disk, live and dead levers supported from a strut at the opposite side of each disk, connections between said live and dead levers, and means for operating said live levers, said operating means comprising bell cranks supported from said struts, power means mounted on said side rails, and operative connections between said power means and said bell cranks.

5. In a car truck, a frame comprising side rails, power means on said side rails adjacent the transverse center line of the truck, interconnected live and dead cylinder levers connected at opposite ends of each power means for respective sides of the truck, supporting wheel and axle assemblies at each end of the truck, braking disks on said assemblies, braking means therefor, and operative connections between said cylinder levers and said braking means for each end of the truck, said operative connections comprising bell cranks fulcrumed on said frame and connected between said braking means and said cylinder levers for each end of the truck.

6. In a railway car truck, a frame, a supporting wheel and axle assembly having a rotatable braking disk, dead truck levers fulcrumed at their upper ends from said frame outboard said disk, a tie bar connecting the lower ends of said dead levers, live and dead truck levers hung from said frame at the opposite side of said disk, a tie bar connecting the lower ends of said last-mentioned levers, a pull rod adjustably connecting said tie bars, brake heads and brake shoes supported on each of said levers, and means for actuating said live truck lever, said actuating means comprising a bell crank fulcrumed on said frame.

7. In a railway car truck, a frame, a supporting wheel and axle assembly having a rotatable braking disk, dead truck levers fulcrumed at their upper ends from said frame outboard said disk, a tie bar connecting the lower ends of said dead levers, live and dead truck levers hung from said frame at the opposite side of said disk, a tie bar connecting the lower ends of said last-mentioned levers, a pull rod adjustably connecting said tie bars, brake heads and brake shoes supported on each of said levers for engagement with opposite faces of said disk at opposite sides of said axle, and means for actuating said live truck lever.

8. In a railway car truck, a frame, a supporting wheel and axle assembly having a rotatable braking disk, dead truck levers fulcrumed at their upper ends from said frame outboard said disk, a tie bar connecting the lower ends of said dead levers, live and dead truck levers hung from said frame at the opposite side of said disk, a tie bar connecting the lower ends of said last-mentioned levers, a pull rod adjustably connecting said tie bars, and means for actuating said live truck lever, said actuating means comprising a bell crank fulcrumed on said frame.

9. In a railway car truck, a frame, a supporting wheel and axle assembly having a rotatable braking disk, dead truck levers fulcrumed at their upper ends from said frame outboard said disk, a tie bar connecting the lower ends of said dead levers, live and dead truck levers hung from said frame at the opposite side of said disk, a tie bar connecting the lower ends of said last-mentioned levers, a pull rod adjustably connecting said tie bars, brake heads and brake shoes supported on each of said levers, and means for actuating said live truck lever.

10. In a railway car truck, a frame, a supporting wheel and axle assembly having a rotatable braking disk, dead truck levers fulcrumed at their upper ends from said frame outboard said disk, a tie bar connecting the lower ends of said dead levers, live and dead truck levers hung from said frame at the opposite side of said disk, a tie bar connecting the lower ends of said last-mentioned levers, a pull rod adjustably connecting said tie bars, and means for actuating said live truck lever.

11. In a railway car truck, a frame comprising side rails, end rails, spaced transoms, struts connecting said end rails and transoms at each end of the truck, supporting wheel and axle assemblies carrying brake disks, braking means for each end of the truck comprising dead levers supported from a strut at one side of each disc, live and dead levers supported from a strut at the opposite side of each disk, connections between said live and dead levers, and means for operating said live levers.

12. In a railway car truck, a frame, a supporting wheel and axle assembly having a plurality of braking disks, dead truck levers fulcrumed from said frame outboard said disks, live and dead truck levers fulcrumed from said frame inboard said disks, operative connections between the levers associated with each disk, brake heads and brake shoes mounted on each of said levers, and means for actuating said live truck levers.

13. In a brake arrangement for a railway car truck, a frame, a supporting wheel and axle assembly having a braking disk mounted thereon, dead truck levers supported from said frame at one side of said disk, live and dead truck levers supported from said frame at the opposite side of said disk, connections between said levers, and means for actuating said live truck levers, said actuating means comprising a bell crank fulcrumed on said frame.

14. In a railway car truck, a frame, spaced supporting wheel and axles each having a plurality of braking disks, dead truck levers supported from said frame at one side of each disk, live and dead truck levers supported from said frame at the opposite side of each disk, connections between the live and dead truck levers associated with each disk, and operating means for simultaneously actuating said live truck levers.

15. In a brake arrangement for a railway car truck, a frame, a supporting wheel and axle assembly having a braking disk, dead truck levers fulcrumed from said frame at one side of said disk, live and dead truck levers fulcrumed from said frame at the opposite side of said disk, connections between said levers, certain of said connections being adjustable, and means for operating said live truck levers.

16. In a railway car truck, a frame, a supporting wheel and axle assembly having a plurality of braking disks, dead truck levers fulcrumed from said frame outboard each of said disks, live and dead truck levers supported from said frame inboard each of said disks, operative connections between the levers associated with each disk, and means for actuating said live truck levers.

17. In a brake arrangement for a railway car truck, a frame, a supporting wheel and axle assembly having a braking disk mounted thereon, dead truck levers supported from said frame at one side of said disk, live and dead truck levers supported from said frame at the opposite side of said disk, connections between said levers, and means for actuating said live truck levers.

18. In a brake arrangement, a truck frame, a supporting wheel and axle assembly, a braking disk secured on said assembly, and braking means associated therewith comprising aligned dead levers supported from the frame at opposite sides of said disk and at one side of the axle, aligned live and dead levers supported from the frame at the opposite side of said disk on the other side of said axle, tie bars connecting the levers at each side of said disk, an adjustable connection between said tie bars, and means for actuating said live lever.

19. In a railway car truck, a frame, spaced supporting wheel and axle assemblies having braking disks, and braking means associated with each disk comprising aligned dead levers at one side thereof, aligned live and dead levers at the opposite side of the disk, interconnected tie bars connecting the levers at each side of the disk, and means on the frame for actuating said live levers, said actuating means comprising spaced bell cranks fulcrumed on said frame and power means operatively connected between said bell cranks.

20. In a railway car truck, a frame, spaced supporting wheel and axle assemblies having braking disks and braking means associated with each disk comprising aligned dead levers at one side thereof, aligned live and dead levers at the opposite side of the disk, interconnected tie bars connecting the levers at each side of the disk, and means on the frame for actuating said live levers, said actuating means comprising spaced bell cranks fulcrumed on said frame and power means operatively connected between said bell cranks, said last-mentioned operative connection comprising interconnected live and dead cylinder levers connected at opposite ends of said power means.

21. In a brake arrangement, a truck frame, a supporting wheel and axle assembly having a braking disk, and braking means associated with said disk comprising dead levers supported from the frame at one side of the axle, live and dead levers supported from the frame at the opposite side of the axle, interconnected tie bars connecting the levers at each side of the disc below said axle, and means for actuating said live lever.

22. In a brake arrangement, a truck frame, a supporting wheel and axle assembly having a braking disk, and braking means associated with said disc comprising dead levers supported from the frame at one side of the axle, live and dead levers supported from the frame at the opposite side of the axle, interconnected tie bars connecting the levers at each side of the disc, and means for actuating said live lever, said actuating means comprising a bell crank fulcrumed from said frame.

23. In a brake arrangement, a truck frame, a supporting wheel and axle having a braking disk and means for braking said disk comprising interconnected dead levers fulcrumed from the frame at one side of said disc, interconnected live and dead levers supported from the frame at the opposite side of said disc, a connection between the levers at opposite sides of the disc, and means for actuating said live lever.

24. In a brake arrangement, a truck frame, a supporting wheel and axle having a braking disk and means for braking said disc comprising interconnected dead levers fulcrumed from the frame at one side of said disc, interconnected live and dead levers supported from the frame at the opposite side of said disc, a connection between the levers at opposite sides of the disc, and means for actuating said live lever, the levers at each side of said disk being disposed at opposite sides of the axle.

25. In a brake arrangement, a frame, a supporting wheel and axle having a braking disk and braking means therefor comprising dead levers fulcrumed from the frame at one side of said disk and connected at their lower ends below said axle, live and dead levers supported from the frame at the opposite side of said disc and connected to each other below said axle, an adjustable connection between the levers at opposite sides of the disk, and means for actuating said live lever.

26. In a brake arrangement, a frame, a supporting wheel and axle having a braking disk and braking means therefore comprising dead levers fulcrumed from the frame at one side of said disk and connected at their lower ends below said axle, live and dead levers supported from the frame at the opposite side of said disc and connected to each other below said axle, an adjustable connection between the levers at opposite sides of the disc, means for actuating said live lever, and a brake shoe supported at an intermediate point on each of said levers for engagement with the adjacent face of said disk.

CARL E. TACK.